United States Patent
Hirota (10) Patent No.: US 7,098,812 B2
(45) Date of Patent: Aug. 29, 2006

(54) OPERATOR IDENTIFYING DEVICE

(75) Inventor: Masaki Hirota, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 696 days.

(21) Appl. No.: 10/455,328

(22) Filed: Jun. 6, 2003

(65) Prior Publication Data

US 2004/0036764 A1    Feb. 26, 2004

(30) Foreign Application Priority Data

Aug. 8, 2002    (JP) .............................. 2002-232078

(51) Int. Cl.
*G08G 1/123* (2006.01)

(52) U.S. Cl. ...................... 340/990; 382/104; 382/103; 340/998; 340/999; 340/995.1; 340/438

(58) Field of Classification Search ........ 340/998–999, 340/990, 995.1, 438; 382/104, 103
See application file for complete search history.

(56) References Cited

U.S. PATENT DOCUMENTS

2002/0126876 A1 *   9/2002  Paul et al. .................. 382/104

FOREIGN PATENT DOCUMENTS

| JP | 08-272974 A | 10/1996 |
|---|---|---|
| JP | H09-35070 A | 2/1997 |
| JP | 2001-338282 A | 12/2001 |
| JP | 2002-133401 A | 5/2002 |

* cited by examiner

*Primary Examiner*—Jeffery Hofsass
*Assistant Examiner*—Shirley Lu
(74) *Attorney, Agent, or Firm*—Global IP Counselors (57) ABSTRACT

An operator identifying device for a vehicle with an operating section located between driver's and non-driver's seats includes a photographing section and an image processing section. The photographing section is configured to obtain image data of a prescribed region encompassing the operating section and at least one of hands of a driver and a non-driver when the at least one of the hands is extended toward the operating section. The image processing section is configured to process the image data to determine whether at least one of the driver and the non-driver is an operator of the operating section. Moreover, an onboard apparatus is provided with the operator identifying device, an operating section and a control section. The control section is configured to control an operation of the onboard apparatus based on an operator identification result of the operator identifying device.

16 Claims, 5 Drawing Sheets

OPERATOR IDENTIFYING DEVICE

BACKGROUND OF THE INVENTION

1. Field of the Invention

The present invention relates to an operator identifying device and an onboard apparatus that utilizes the operator identifying device. More specifically, the present invention relates to an operator identifying device that identifies whether an operator of an operating section is a driver or a non-driver, and an onboard apparatus that utilizes an operator identification result of the operator identifying device to control operability of the onboard apparatus.

2. Background Information

An example of an onboard apparatus is a navigation system. If a driver operates the navigation system when a vehicle is moving, the driver could be distracted by complex operations of the navigation system. Thus, the amount of time spent by the driver watching the road ahead is reduced while the driver is distracted by the complex operations of the navigation system. In view of this situation, the navigation systems of prior art are interlocked with vehicle speed sensors and the like to permit only simple operations when the vehicle is in motion. The complex operations, such as setting a destination, are not permitted while the vehicle is moving. Thus, with the navigation systems of prior art, it is necessary to stop the vehicle in order to perform such complex operations. Consequently, a person riding in the passenger's seat who is not driving also cannot perform any complex operation, e.g., setting a destination, while the vehicle is moving.

Therefore, an operator identifying device that determines whether an operator is a driver or not and utilizing the operator identifying device in an onboard apparatus such as a navigation system is a feasible means of resolving this problem. A related device of prior art is a hand movement recognizing device, which identifies movements of a hand. This type of the hand movement recognizing device is described in Japanese Laid-Open Patent Publication No. 8-272974. The device presented in this publication uses left and right camera images to detect/extract left and right hands of a single person and recognize the bodily movements or hand movements of the person.

In view of the above, it will be apparent to those skilled in the art from this disclosure that there exists a need for an improved operator identifying device. This invention addresses this need in the art as well as other needs, which will become apparent to those skilled in the art from this disclosure.

SUMMARY OF THE INVENTION

It has been discovered that the hand movement recognizing device of the prior art requires a complex structure because the hand movement recognizing device of the prior art utilizes left and right camera images to extract the portion beyond the wrist (hereinafter called "palm") and executes image processing to identify movements of the palm. Furthermore, it can only identify the left and right palms of a single person.

In order to solve the aforementioned problems, an operator identifying device for a vehicle with an operating section located between a driver's seat and a non-driver's seat to be operated from the driver's seat and the non-driver's seat is provided that comprises a photographing section and an image processing section. The photographing section is configured and arranged to obtain image data of a prescribed region encompassing at least the operating section and at least one of a hand of a driver and a hand of a non-driver when the at least one of the hand of the driver and the hand of the non-driver is extended toward the operating section. The image processing section is configured to process the image data obtained with the photographing section to determine whether at least one of the driver and the non-driver is an operator of the operating section when the at least one of the hand of the driver and the hand of the non-driver has been extended into the prescribed region.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4(*a*) is a schematic view of an infrared image of a prescribed region taken with the infrared camera of the navigation system illustrated in FIG. 1 in accordance with the one embodiment of the present invention;

FIG. 4(*b*) is a schematic view of an image of the prescribed region taken with a normal visible light camera for comparison with the infrared image illustrated in FIG. 4(*a*)

DETAILED DESCRIPTION OF THE PREFERRED EMBODIMENTS

Selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
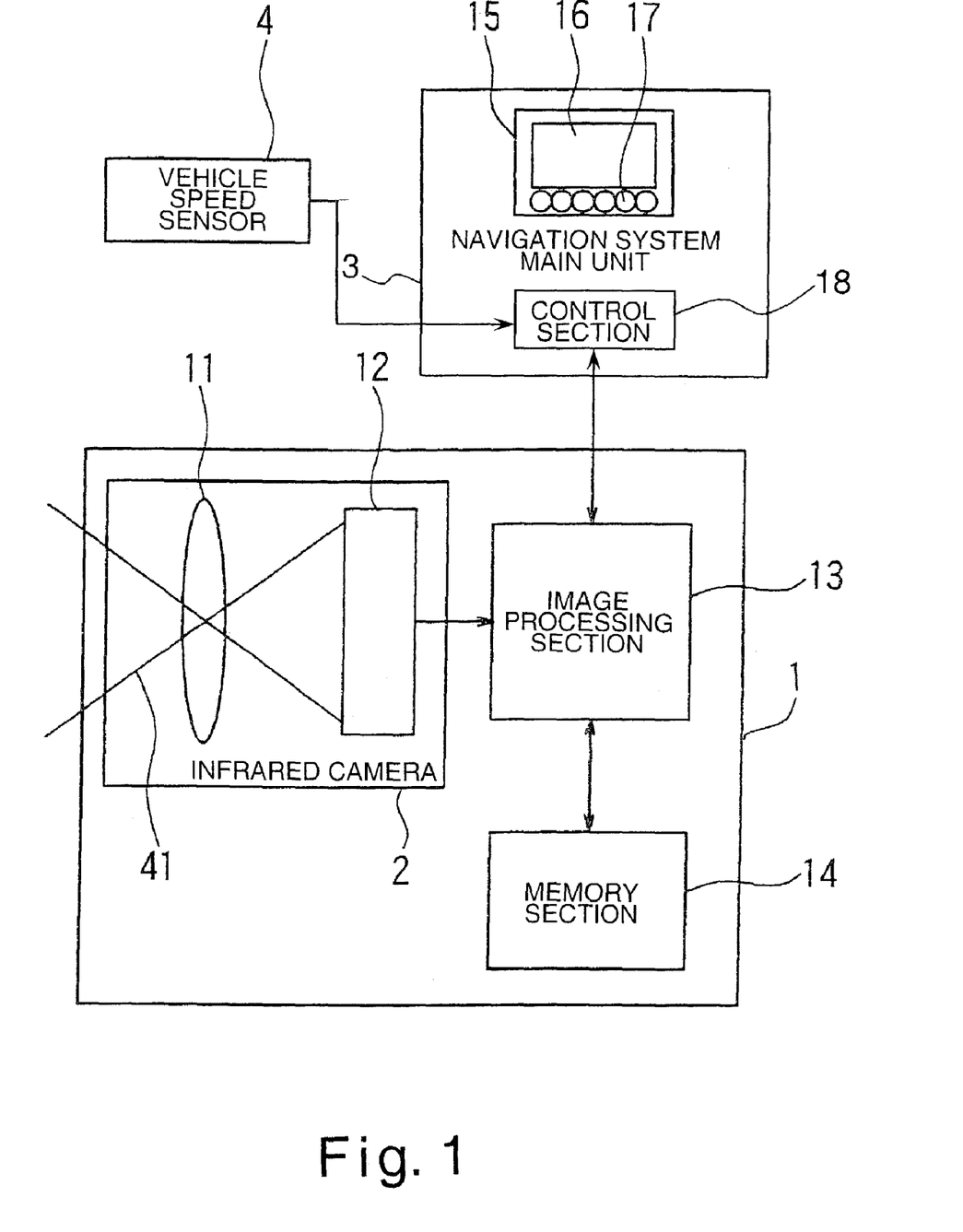
FIG. 1 is a schematic view of an overall system configuration of a navigation system equipped with an operator identifying device in accordance with one embodiment of the present invention.

Referring initially to FIG. 1, an overall system configuration of an onboard apparatus for a vehicle with an operator identifying device is illustrated in accordance with one embodiment of the present invention. In this embodiment, the onboard apparatus is a navigation system. The operator identifying device in accordance with the present invention makes a determination of whether a person attempting to operate the operating section is the driver or the non-driver in a relatively simple manner. When a driver extends his or her hand toward an operating section of the navigation system to operate the navigation system while the vehicle is traveling, the operator identifying device in accordance with this embodiment of the present invention is configured and arranged to determine an operator of the operating section is the driver. Then the operability of the navigation system is switched automatically to a mode in which only simple operations can be performed. On the other hand, when it is determined that the operator is not the driver, the operability of the navigation system is switched to a mode in which all operations, including complex operations, are allowed regardless of whether the vehicle is traveling or not. In other words, by combining the operator identifying device with the onboard apparatus, the onboard apparatus can be controlled in a manner appropriate for the driver or the non-driver depending on whether the operator is the driver or the non-driver. As a result, the operating performance of the onboard apparatus can be improved. Thus, with the navigation system equipped with the operator identifying device in accordance with this embodiment of the present invention, it is not necessary to stop the vehicle in order for a passenger or a non-driver sitting in a passenger's seat to perform complex operations.

As seen in FIG. 1, the onboard apparatus or the navigation system in accordance with this embodiment of the present invention basically comprises a camera and image processing device 1, a navigation system main unit 3, and a vehicle speed sensor 4. The camera and image processing device 1 preferably constitutes an operator identifying device of the present invention. Also, the vehicle speed sensor 4 preferably constitutes a vehicle traveling state detecting section.

The camera and image processing device 1 basically comprises a photographing section or an infrared camera 2, an image processing section 13, and a memory section 14. The infrared camera 2 is connected to the image processing section 13 by a signal line. More specifically, the infrared camera 2 is configured to produce a signal indicative of image data, which is sent to the image processing section 13 through the signal line. The image processing section 13 is connected to the memory section 14 and a control section 18 of the navigation system main unit 3 by signal lines. More specifically, the image processing section 13 is configured to produce signals indicative of various image data, which are sent to the memory section 14 and/or the control section 18 of the navigation system main unit 3 through the signal lines. The memory section 14 is configured to store various data including the image data sent from the image processing section 13.

The navigation system main unit 3 preferably includes a displaying and operating section 15 and the control section 18. In this embodiment, the displaying and operating section 15 preferably constitutes an operating section of the present invention. The displaying and operating section 15 of the navigation system main unit 3 comprises a display portion 16 and an operating portion 17. The display portion 16 of the displaying and operating section 15 preferably includes a display screen which is preferably a liquid crystal monitor or a CRT. The operating portion 17 of the displaying and operating section 15 preferably comprises dial switches, button switches or touch panel switches, or any combination of such. The control section 18 of the navigation system main unit 3 is configured to control the operability of the navigation system depending on an operator identification result of the camera and image processing device 1. Moreover, the control section 18 of the navigation system main unit 3 is operatively coupled to the vehicle speed sensor 4 by a signal line. More specifically, the vehicle speed sensor 4 is configured to produce a signal indicative of a vehicle speed, which is sent to the control section 18 of the navigation system main unit 3.

The control section 18 of the navigation system main unit 3 preferably includes a microcomputer with a control program that controls the operability of the navigation system as discussed in more detail below. The control section 18 of the navigation system main unit 3 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the control section 18 of the navigation system main unit 3 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The infrared camera 2 basically comprises a lens 11 and an infrared sensor 12. The infrared sensor 12 is, for example, a non-cooled sensor made of amorphous silicon. The infrared camera 2 is preferably configured to detect wavelength within a prescribed band, e.g., 10 micrometer band, to avoid influence from infrared wavelengths emitted from the dashboard and other surrounding objects that have been heated by sunrays and sunlight. Of course, it will be apparent to those skilled in the art from this disclosure that the precise value of the prescribed band of the wavelengths detected with the infrared camera 2 can be varied as long as it is adapted to carry out the present invention.

The infrared camera 2 is configured to obtain an image data of a prescribed region based on incident infrared ray 41 that passes through the lens 11 of the infrared camera 2 and strikes the infrared sensor 12. The incident infrared ray 41 forms an image of objects photographed on a detection section of the infrared sensor 12. In the present invention, the infrared camera 2 is configured to photograph the objects including at least the displaying and operating section 15 of the navigation system main unit 3 and a hand of the driver or the non-driver that is extended toward the displaying and operating section 15. Preferably, the infrared camera 2 photographs the prescribed region that includes the display portion 16 and the operating portion 17 of the displaying and operating section 15 and the areas adjacent the displaying and operating section 15 where the driver's hand and the non-driver's hand would be in order to operate the operating portion 17 of the displaying and operating section 15. The infrared sensor 12 is configured to convert the image of the prescribed region formed based on the incident infrared ray 41 into the image data, e.g., an electric signal. The infrared sensor 12 is further configured to send the image data to the image processing section 13. The image processing section 13 is configured and arranged to temporarily store the image data in the memory section 14 and access the image data from the memory section 14 for processing of the image data. As discussed in more detail below, the image processing section 13 is further configured and arranged to execute operations and processing so as to extract a hand image from the image data or the like and identify the operator, and send the result to the control section 18 of the navigation system main unit 3.

While the image processing section 13 and the memory section 14 are illustrated as separate from the control section 18, it will be apparent to those skilled in the art from this disclosure that the image processing section 13 and the memory section 14 can be part of the control section 18. Alternatively, the image processing section 13 is separate from the control section 18, and preferably includes a microcomputer with a control program that controls the processing of image data obtained with the infrared camera 2 as discussed below. The image processing section 13 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the image processing section 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
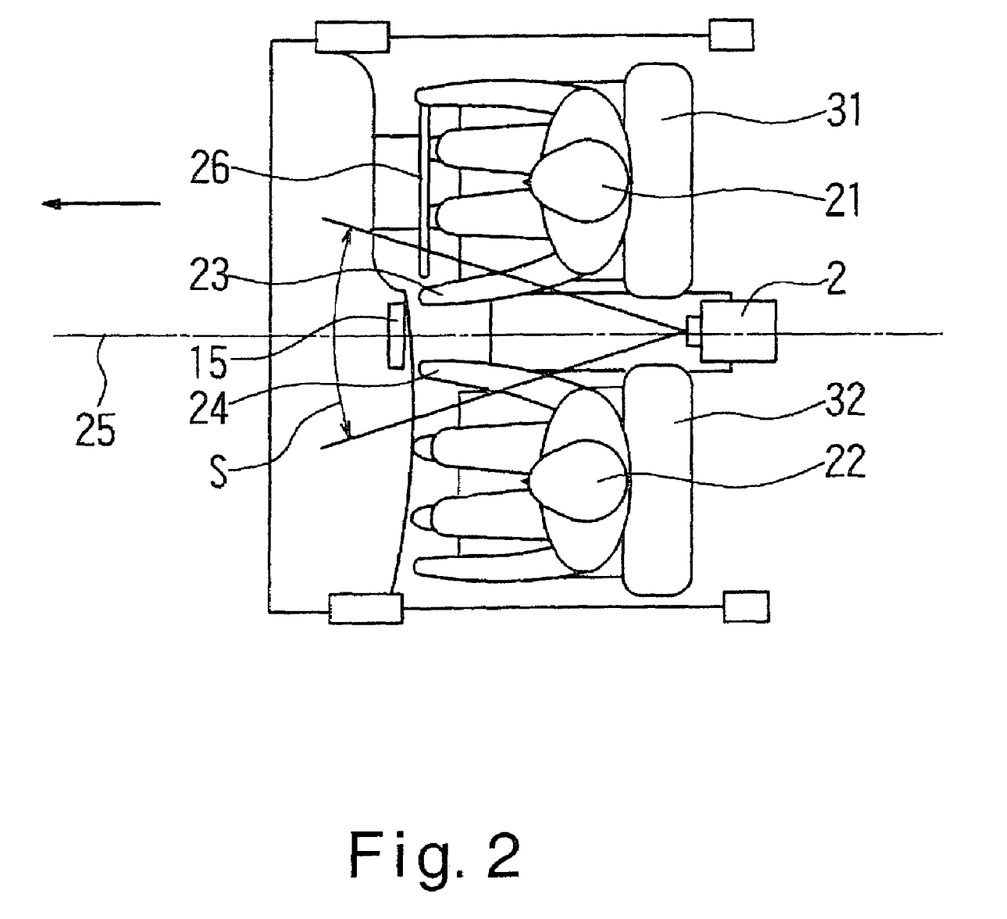
FIG. 2 is a diagrammatic top plan view of a vehicle front section illustrating an installation position of an infrared camera and a displaying and operating section of the navigation system illustrated in FIG. 1 in accordance with the one embodiment of the present invention.

FIG. 2 is a diagrammatic top plan view of a front section of the vehicle with the navigation system in accordance with this embodiment of the present invention. In the vehicle illustrated in FIG. 2, a steering wheel is installed on the right side. An arrow in FIG. 2 indicates a forward direction in which the vehicle advances. The infrared camera 2 is installed on a ceiling section of the vehicle at a location that is on or substantially close to a vertical center plane 25 of the vehicle. More specifically, the infrared camera 2 is configured to be installed to readily photograph an area around a left hand 23 of a driver 21 in the driver's seat 31 and an area around a right hand 24 of a non-driver 22 in a non-driver's seat or a front passenger's seat 32 when these hands 23 and 24 are extended toward the displaying and operating section 15 of the navigation system main unit 3. Moreover, the infrared camera 2 is slanted downward and forward and installed in such a position that neither the area of the left hand 23 of the driver 21 nor the area of the right hand 24 of the non-driver 22 is hidden from the infrared camera 2 behind the driver's or non-driver's head or upper body when the driver 21 or the non-driver 22 bends forward. Thus, as seen in FIG. 2, the infrared camera 2 is preferably configured and arranged to photograph the prescribed region with a field of view S that encompasses the left hand 23 of the driver 21, the right hand 24 of the non-driver 22 and the displaying and operating section 15 of the navigation system main unit 3 from a diagonally rearward and upward position.

Accordingly, the photographic field of view S of the infrared camera 2 includes respective hands 23 and 24 of both the driver 21 and a person sitting in the passenger's seat (the non-driver 22) that are closer to the vertical center plane 25 of the vehicle. In this embodiment of the present invention, since the infrared camera 2 is installed generally on the vertical center plane 25 of the vehicle, a limited photographing range covered with a single infrared camera 2 is adequate to be used to determine the operator of the displaying and operating section 15 of the navigation system main unit 3.

Figure 3:
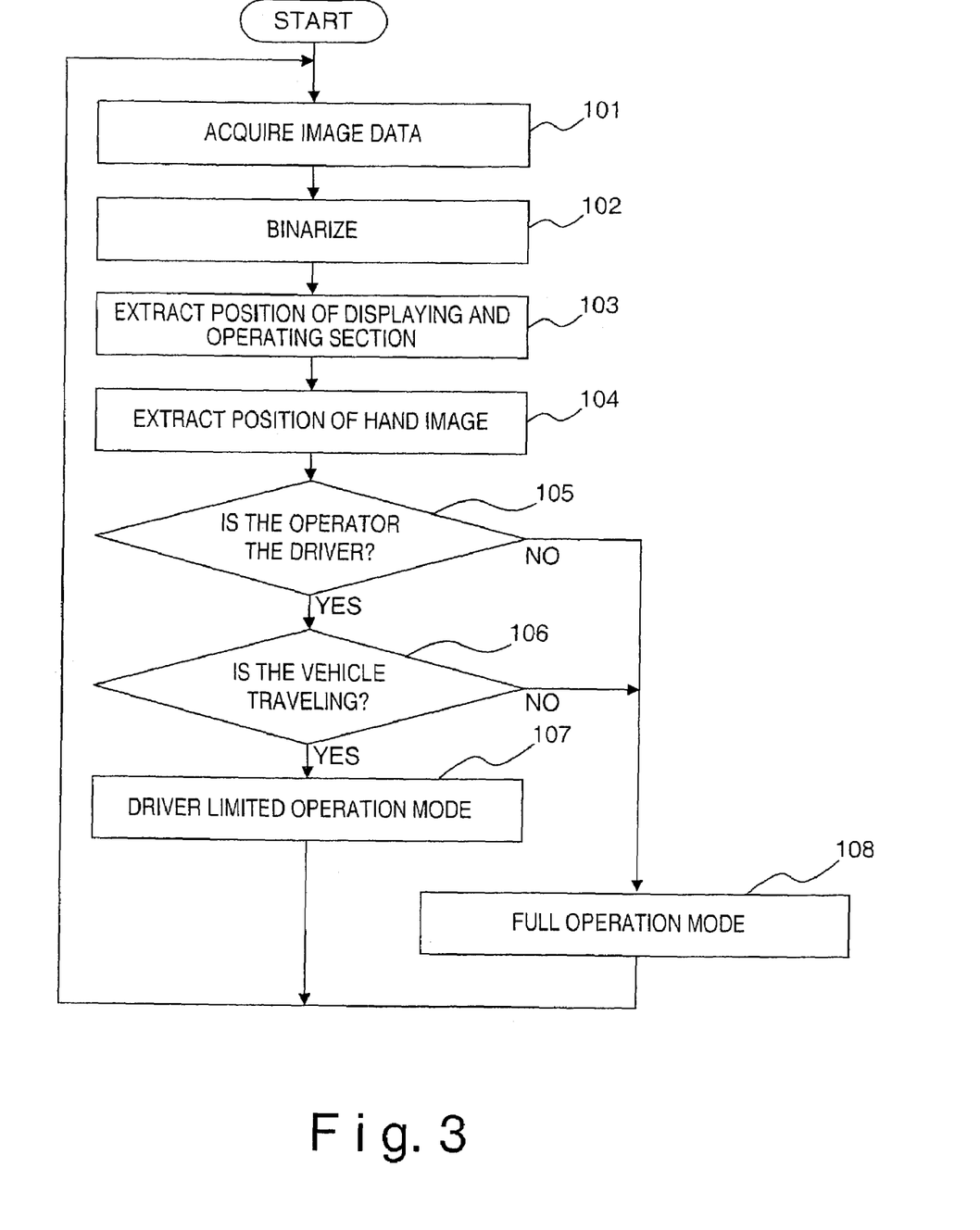
FIG. 3 is a flowchart showing a control flow executed in the navigation system illustrated in FIG. 1 in accordance with the one embodiment of the present invention.

FIG. 3 is a flowchart showing a control flow for processing the image data and controlling the displaying and operating section 15 executed in the image processing section 13 and in the control section 18 of the navigation system main unit 3 illustrated in FIG. 1. The control flow starts when a power switch of the navigation system main unit 3 is turned on, which causes an operator identification function of the operator identifying device installed in the navigation system to start.

Figure 4A:
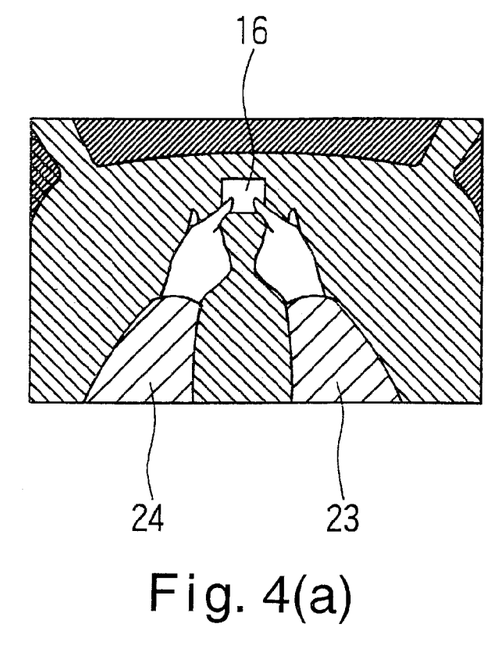
Figure 4B:
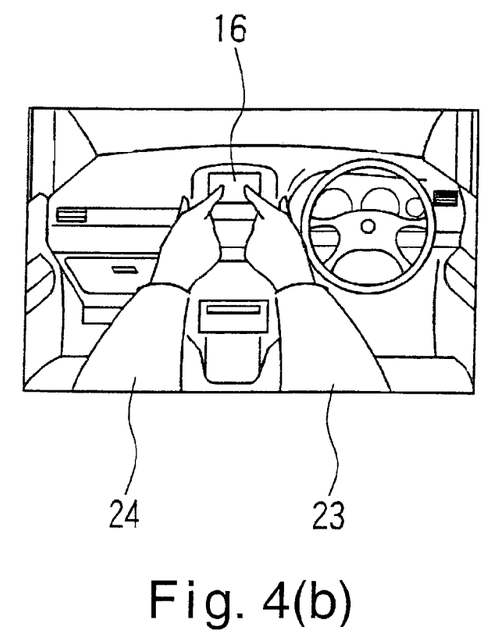

In step 101 of FIG. 3, the image processing section 13 is configured to acquire the image data indicative of an infrared image photographed with the infrared camera 2 and store it temporarily in the memory section 14. This image data acquisition and storage is executed at fixed time intervals, for example, every 0.1 second. FIGS. 4(a) and 4(b) show a comparison between the infrared image photographed with the infrared camera 2 and an image photographed with a normal visible light camera. FIG. 4(a) schematically illustrates an infrared image of an area around the displaying and operating section 15 obtained with the infrared camera 2 based on infrared ray emitted from the display screen of the display portion 16 and human bodies. FIG. 4(b) schematically illustrates an image of the area around the displaying and operating section 15 when the area is photographed with a normal visible light camera.

In the infrared image shown in FIG. 4(a), the display screen of the display portion 16 of the displaying and operating section 15 and the hands 23 and 24 of the driver 21 and the non-driver 22 are relatively easier to identify than in the image shown in FIG. 4(b) that is photographed with the normal visible light camera. Since the display screen of the display portion 16 is preferably a liquid crystal monitor or a CRT, the display screen of the display portion 16 is illuminated by a backlight or by an electron beam. Accordingly, the display screen of the display portion 16 has a higher temperature than its surroundings. Also, a surface of a human body maintains a relatively stable temperature of 30 to 32° C., which is higher than ambient temperature. Moreover, the amount of infrared radiation emitted is particularly high at the palms, wrists, and other areas where the skin is exposed. The surface temperature of the forearms and other areas covered with clothing is lower than that of the palms but the amount of infrared radiation from these areas is still larger than that of surrounding objects. Consequently, the display screen of the display portion 16 and the hands 23 and 24 of the driver 21 and the non-driver 22 are relatively easily distinguishable in the image obtained with the infrared camera 2 as seen in FIG. 4(a). Hereinafter, "hand" refers to the forearm and the palm, which includes the entire hand beyond the wrist. Since the windshield of the vehicle does not allow infrared rays in the 10 micrometer band to pass into the vehicle from the outside, only infrared ray emitted from the inside surface of the windshield enters the infrared camera 2. As a result, unlike the image obtained with a visible light camera as seen in FIG. 4(b), image information from outside the windshield and the interior components of the vehicle is not entered in the infrared camera 2, and thus, not reflected in the image data obtained with the infrared camera 2.

Figure 5:
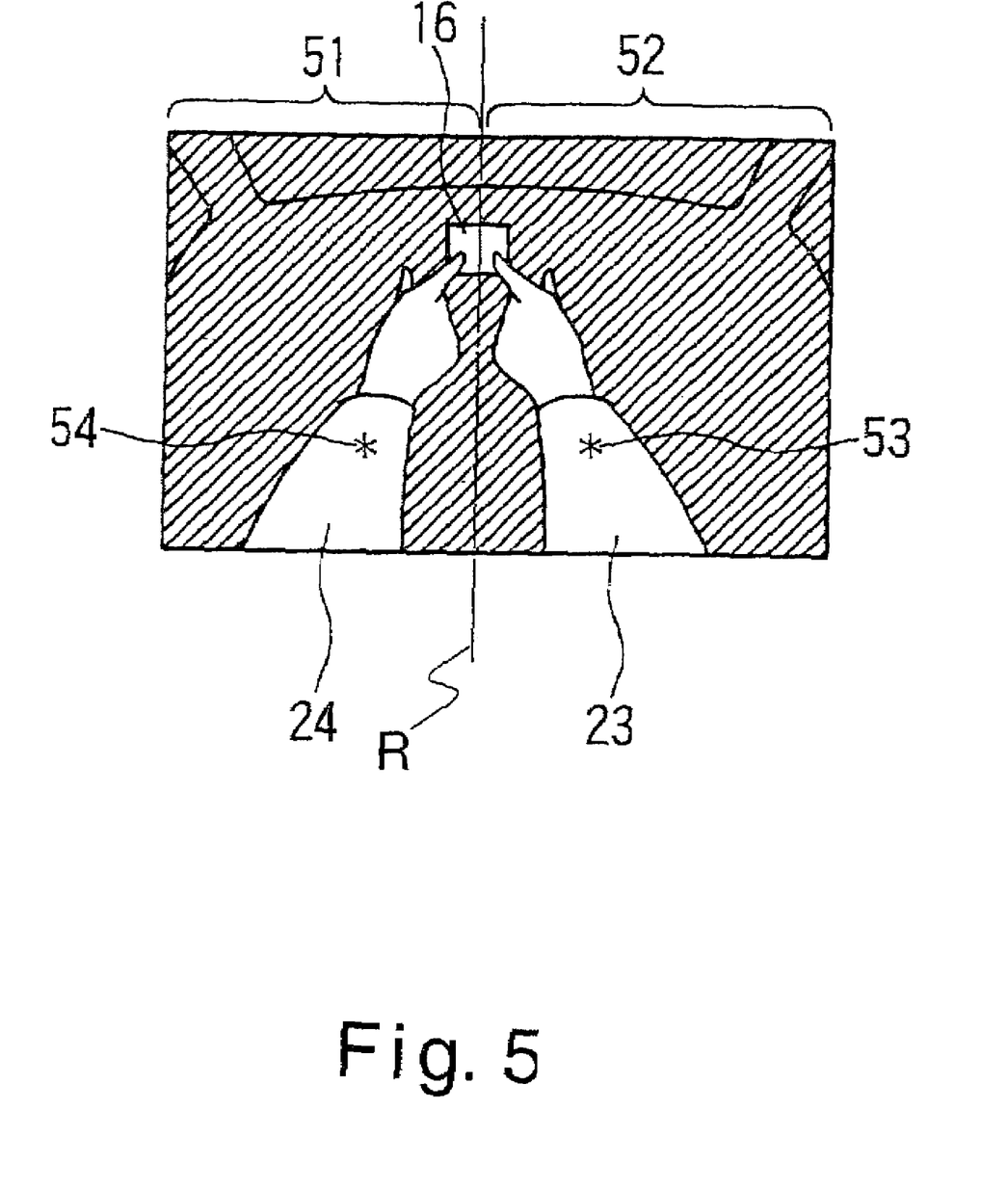
FIG. 5 is a schematic view of a binarized image of the prescribed region showing relative positions of centers of gravities of hand images with respect to a reference line in accordance with the one embodiment of the present invention.

In step 102, the image processing section 13 is configured to execute a binary processing to the image data obtained with the infrared camera 2 and store the image data in the memory section 14. More specifically, in the binarizing process, the image processing section 13 is configured to determine if the brightness level of each pixel of the image data is higher or lower than a predetermined binarization threshold value. Then the image processing section 13 is further configured to store the image data after the binarization again in the memory section 14. The predetermined binarization threshold value is preferably set such that a signal detected from an area around an image corresponding to a hand exceeds the level of the predetermined binarization threshold value. FIG. 5 shows a schematic view of a binarized image based on the image data after binarization in step 102.

In step 103, the image processing section 13 is configured to extract a display screen image corresponding to the display screen of the display portion 16 from the image data. The extraction of the display screen image is relatively easy because there is little displacement occurred between the photographing direction of the infrared camera 2 and the relative position of the display portion 16. In other words, a position of the display screen of the display portion 16 is normally fixed within the field of view S of the infrared camera 2. The extraction of the display screen is accomplished by comparing the image data with reference data. The reference data includes shape characteristics and size of the display screen of the display portion 16, and is pre-stored in the memory section 14. Also, in step 103, a left-right centerline of the display screen image corresponding to the display screen of the display portion 16 in the binarized image is set as a reference line R for defining a non-driver's seat side or a left region 51 and a driver's seat side or a right region 52 as seen in FIG. 5. Preferably, the reference line R and the vertical center plane 25 are coincident or substantially coincident. Of course, depending on the arrangement of the interior of the vehicle, the vertical center plane 25 can be offset from the reference line R. In other words, by using the reference line R, the present invention can be easily used in a wide variety of vehicles.

In step 104, the image processing section 13 is configured to extract a hand image that represents the hand 23 or 24 of an operator who extends the hand 23 or 24 toward the operating portion 17 of the displaying and operating section 15. More specifically, the image processing section 13 is configured to extract the hand image from the binarized image shown in FIG. 5 and calculate a position of the hand image. The extraction of the hand image from the binarized image is made relatively easier by first culling image data corresponding to the display screen image of the display portion 16 obtained in step 103 from the binarized image. After the hand image is extracted, a dimension of the hand image is calculated according to the result of the hand image extraction. The dimension of the hand image is compared to a prescribed threshold value. If the dimension of the hand image is larger than the prescribed threshold value, a center of gravity 53 or 54 of the hand image corresponding to a particular one of the hands 23 and 24 is calculated.

In step 105, the image processing section 13 is configured to determine from the hand image whether the driver is the operator. In this embodiment, the driver is identified as the operator if the center of gravity 53 of the hand image is in the right region 52 as seen in FIG. 5. The operator is identified as the non-driver sitting in the passenger's seat if the center of gravity 54 of the hand image is in the left region 51. If both of the centers of gravities 53 and 54 exist in the right and left regions 52 and 51, respectively, priority is given to determining the driver as the operator. Thus, in such a case, the driver is identified as the operator of the navigation system.

More specifically, when the driver 21 grips the steering wheel with his or her right hand and extends his or her left hand 23 toward the displaying and operating section 15 of the navigation system while the vehicle is moving, the center of gravity 53 of the hand image corresponding to the driver's left hand 23 will exist in the right region 52 as seen in FIG. 5. Even if a finger tip or a portion of the palm of the driver 21 is in the left region 51, the bulk of the hand (the palm and the forearm) image of the driver 21 will be in the right region 52 and the center of gravity 53 of the hand image will exist in the right region 52. Also, although a person seated in the passenger seat (the non-driver 22) can move his or her seat left and right more freely than driver, a position that does not disturb the driver 21, i.e., a position within the left region 51 in FIG. 5, will be selected so long as there is the driver 21 on the right side. Thus, when the person seated in the passenger's seat extends the right hand 24 toward the displaying and operating section 15, the center of gravity 54 of the hand image corresponding to the hand 24 of the person seated in the passenger's seat will exist in the left region 51 as seen in FIG. 5.

An operator identification result (i.e., the identity of the operator: driver or passenger) obtained in step 105 of FIG. 3 is sent to the control section 18 of the navigation system main unit 3.

In step 106, the control section 18 of the navigation system main unit 3 is configured to determine if the vehicle is traveling based on the signal sent from the vehicle speed sensor 4. The control section 18 is further configured to control the onboard apparatus or the navigation system in accordance with the determination of a vehicle traveling state obtained with the vehicle speed sensor 4 and the operator identification result obtained with the image processing section 13 in step 105. More specifically, if the driver 21 is identified as the operator and the vehicle is traveling, the control section 18 is configured to proceed to step 107 in which the navigation system is set to "driver limited operation mode". In the "driver limited operation mode", only simple operations or operable items are allowed. In step 106, if the situation is any other than one in which the driver 21 is identified as the operator and the vehicle is traveling, then control section 18 is configured to proceed to step 108 in which the navigation system is set to "full operation mode". In the "full operation mode", all of the operations or operable items are allowed.

More specifically, the "driver limited operation mode" allows such operations as enlarging and reducing the display size, moving the display position center up, down, left, and right, and changing the display mode (planar map display⇆three-dimensional graphic display). On the other hand, the "full operation mode" allows all operations to be operated. These operations include such complex operations as setting a destination, searching for a shortest route, and searching for a route to avoid congestion, which the driver 21 is not permitted to perform while the vehicle is traveling, i.e., in the "driver limited operation mode".

After steps 107 and 108, the control flow returns to step 101 and the control flow is preferably repeated at a prescribed frequency, e.g., every 0.1 second. Of course, it will be apparent to those skilled in the art from this disclosure that the frequency of the control flow can be varied as long as the frequency is adapted to carry out the present invention.

As explained above, the image data is obtained by using the single infrared camera 2 and sent to the image processing section 13 that is configured to determine whether the operator of the navigation system is the driver or not. Thus, the operator can be identified relatively easily by extracting a hand image from the image data obtained with the infrared camera 2. More specifically, the image processing section 13 is configured to identify the operator by determining if the center of gravity 53 or 54 of the hand image exists in the driver's seat side 52 or the passenger's seat side 51 with respect to the right-left reference line R. This arrangement of the present invention enables the structure of the onboard apparatus with the operator identifying device to be simpler than that of the prior art, and thus, manufacturing cost to be reduced.

Moreover, in the present invention, since the infrared ray detected by the infrared camera 2 is preferably set within the 10 micrometer wavelength band which corresponds to the infrared ray emitted from the human body, the hand image that represents a human (the driver or the non-the driver) hand is emphasized more than other images from inside the vehicle or from the windshield. Accordingly, the infrared image that can be readily binarized is obtained for identifying the operator, regardless of whether it is daytime or nighttime. As a result, the processing required to extract the hand image from the image data is simplified. Thus, the calculations of the dimension of the hand image and the center of gravity of the hand image are made relatively easy to perform.

Moreover, in this embodiment of the present invention, the left-right centerline of the display screen image that represents the display screen of the display portion 16 is preferably used as the reference line R to determine a relative hand position of the driver or the non-driver for identifying the operator. In other words, as seen in FIG. 5, the binarized image based on the infrared image obtained with the infrared camera 2 is divided into the left region 51 and the right region 52 at the left-right centerline of the display screen image corresponding to the display screen of the display portion 16 to determine which region contains the center of gravity 53 or 54 of the hand image. Thus, it is possible to identify the operator with high precision even when a left-right centerline of a photographic image photographed with the infrared camera 2 and the left-right centerline of the display screen image are out of alignment due to relative positions between an installation position of the infrared camera 2 and an installation position of the navigation system main unit 3.

Furthermore, in this embodiment of the present invention, the reference line R is established based on a position of the display screen of the display portion 16 as determined in the course of processing the image data. However, it will be apparent to those skilled in the art from this disclosure that it is also possible to use a position of the display screen of the display portion 16 that has been previously stored in the memory section 14. This arrangement will enable the reference line to be established in a reliable manner even when there is a possibility of making it difficult to recognize the display screen in the image data obtained from the infrared camera 2, e.g., the weather is cold and the temperature of the display screen of the display portion 16 is low.

Also, this embodiment of the present invention is described using a vehicle in which the steering wheel is on the right side of the vehicle and only two people could sit in the front seats. However, it will be apparent from this disclosure that a simple software change will enable the invention to be applied to a vehicle having the steering wheel on the left side and/or a front seating arrangement that accommodates three or more people.

Moreover, in this embodiment of the present invention, the onboard apparatus that utilizes the operator identifying device is the navigation system, and the operator identification result of the operator identifying device is used to control the operability of the navigation system. However, it is apparent to those skilled in the art from this disclosure that the operator identifying device of the present invention is not limited to such an arrangement. For example, the present invention might also be applied to an arrangement in which the onboard apparatus is a combination of a navigation system, a television tuner device, a video device (DVD, VTR, etc.), and an information processing device and these devices share a single display device by means of a switching configuration. In other words, the navigation system is provided with a plurality of external input terminals for receiving video and voice signals from video decks and the like and a display switching operation of the displaying and an operating section of the navigation system is used to select the display of one of the devices, i.e., the navigation system, video, or information processing device.

In such a combined onboard apparatus or system, the operator identifying function of the operator identifying device in accordance with the present invention can be used to control the system such that the driver can instantaneously switch to the display of navigation information from the display of other content by merely extending his or her hand as needed. For example, when the navigation system is running and a person seated in the passenger's seat is using the display screen to watch television, a video, or the like, the driver can cause a navigation screen indicating the current position of the vehicle to be displayed instantaneously on the display screen by merely extending a hand to a position close to an operating section without directly operating switches or buttons on the displaying and operating section. This kind of display screen switching control performed by the operator identifying device is convenient because it allows the driver switch to a required screen instantaneously without directly touching switches or buttons on the operating section.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-232078. The entire disclosure of Japanese Patent Application No. 2002-232078 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An operator identifying device for a vehicle with an operating section located between a driver's seat and a non-driver's seat to be operated from the driver's seat and the non-driver's seat, comprising:

a photographing section configured and arranged to obtain image data of a prescribed region encompassing at least the operating section and at least one of a hand of a driver and a hand of a non-driver when the at least one of the hand of the driver and the hand of the non-driver is extended toward the operating section; and an image processing section configured to extract a hand image that represents the at least one of the hand of the driver and the hand of the non-driver from the image data by applying binary processing to the image data, to find a center of gravity of the hand image, and to determine an operator of the operating section based on whether the center of gravity is on a driver's seat side or a non-driver's seat side of a reference line that divides the image data into the driver's seat side and the non-driver's seat side when the at least one of the hand of the driver and the hand of the non-driver has been extended into the prescribed region, the image processing section being further configured to output an identification result to control an operation of a vehicle apparatus based on the identification result.

2. The operator identifying device as recited in claim 1, wherein
the image processing section is further configured to determine that the operator is the driver when the hand image of the at least one of the hand of the driver and the hand of the non-driver is on the driver's seat side regardless of whether a hand image other than the hand image exists in the non-driver's seat side.

3. The operator identifying device as recited in claim 1, wherein
the image processing section is further configured to determine that the operator is the non-driver when the hand image of the at least one of the hand of the driver and the hand of the non-driver is only on the non-driver's seat side of the reference line.

4. The operator identifying device as recited in claim 1, wherein
the image processing section is further configured to determine that the operator is the driver when the center of gravity of the hand image is on the driver's seat side regardless of whether a center of gravity of a hand image other than the hand image exists on the non-driver's seat side.

5. The operator identifying device as recited in claim 1, wherein
the image processing section is further configured to determine that the operator is the non-driver when the center of gravity of the hand image is only on the non-driver's seat side of the reference line.

6. The operator identifying device as recited in claim 1, wherein
the reference line is on a vertical center plane of the operating section that substantially divides the operating section equally into the driver's seat side and the non-driver's seat side, and
the photographing section is configured to be installed generally on the vertical center plane of the operating section.

7. The operator identifying device as recited in claim 1, wherein
the photographing section is configured to be installed generally on a vertical center plane of the vehicle that substantially divides the vehicle equally into the driver's seat side and the non-driver's seat side, the reference line is generally on the vertical center plane of the vehicle, and the operating section is arranged generally on the vertical center plane of the vehicle.

8. The operator identifying device as recited in claim 1, wherein
the photographing section includes an infrared camera.

9. The operator identifying device as recited in claim 1, wherein
the photographing section includes an infrared camera that is configured to detect a display screen of the operating section with a temperature that is higher than ambient temperature, and
the reference line is set to a left-right centerline of an image of the display screen of the operating section in the image data obtained with the infrared camera.

10. An onboard apparatus comprising:
an operating section configured to be positioned in a front section of a vehicle between a driver's seat and a non-driver's seat such that the operating section is operable from the driver's seat and the non-driver's seat;
an operator identifying device including
a photographing section configured and arranged to obtain image data of a prescribed region encompassing at least the operating section and at least one of a hand of a driver and a hand of a non-driver when the at least one of the hand of the driver and the hand of the non-driver is extended toward the operating section, and
an image processing section configured to extract a hand image that represents the at least one of the hand of the driver and the hand of the non-driver from the image data by applying binary processing to the image data, to find a center of gravity of the hand image, and to determine an operator of the operating section based on whether the center of gravity is on a driver's seat side or a non-driver's seat side of a reference line that divides the image data into the driver's seat side and the non-driver's seat side when the at least one of the hand of the driver and the hand of the non-driver has been extended into the prescribed region; and
a control section configured to control an operation of the onboard apparatus based on an operator identification result performed by the operator identifying device.

11. The onboard apparatus as recited in claim 10, further comprising
a vehicle traveling state detecting section configured and arranged to detect a traveling state of the vehicle, and
the control section being further configured to control operability of the onboard apparatus based on the traveling state of the vehicle.

12. The onboard apparatus as recited in claim 10, wherein
the control section is further configured to limit operable items of the operating section to a greater degree when the operator identifying device identifies the driver as the operator than when the operator identifying device identifies the non-driver as the operator when the vehicle is traveling.

13. The onboard apparatus as recited in claim 10, wherein
the reference line is on a vertical center plane of the operating section that substantially divides the operating section equally into the driver's seat side and the non-driver's seat side, and
the photographing section is configured to be installed generally on the vertical center plane of the operating section.

14. The onboard apparatus as recited in claim 10, wherein the photographing section includes an infrared camera that is configured to detect a display screen of the operating section with a temperature that is higher than ambient temperature, and the reference line is set to a left-right centerline of an image of the display screen of the operating section in the image data obtained with the infrared camera.

15. An operator identifying device for a vehicle with an operating section located between a driver's seat and a non-driver's seat to be operated from the driver's seat and the non-driver's seat, comprising:

photographing means for obtaining image data of a prescribed region encompassing at least the operating section and at least one of a hand of a driver and a hand of a non-driver when the at least one of the hand of the driver and the hand of the non-driver is extended toward the operating section; and image processing means for extracting a hand image that represents the at least one of the hand of the driver and the hand of the non-driver from the image data by applying binary processing to the image data, for finding a center of gravity of the hand image, and for determining an operator of the operating section based on whether the center of gravity is on a driver's seat side or a non-driver's seat side of a reference line that divides the image data into the driver's seat side and the non-driver's seat side when at least one of the hands of the driver and the non-driver has been extended into the prescribed region, and for outputting an identification result to control an operation of a vehicle apparatus based on the identification result.

16. A method of identifying an operator of an operating section located between a driver's seat and a non-driver's seat of a vehicle to be operated from the driver's seat and the non-driver's seat, comprising:

obtaining image data of a prescribed region encompassing the operating section and at least one of a hand of a driver and a hand of a non-driver when the at least one of the hand of the driver and the hand of the non-driver is extended toward the operating section;

extracting a hand image that represents the at least one of the hand of the driver and the hand of the non-driver from the image data by applying binary processing to the image data when at least one of the hand of the driver and the hand of the non-driver has been extended into the prescribed region;

finding a center of gravity of the hand image;

determining an operator of the operating section based on whether the center of gravity is on a driver's seat side or a non-driver's seat side of a reference line that divides the image data into the driver's seat side and the non-driver's seat side; and outputting an identification result to control an operation of a vehicle apparatus based on the identification result.

* * * * *